United States Patent
Patnaik et al.

(10) Patent No.: US 11,829,607 B2
(45) Date of Patent: *Nov. 28, 2023

(54) ENABLING DATA INTEGRITY CHECKING AND FASTER APPLICATION RECOVERY IN SYNCHRONOUS REPLICATED DATASETS

(71) Applicant: NetApp Inc., San Jose, CA (US)

(72) Inventors: Pranab Patnaik, Cary, NC (US); Akhil Kaushik, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,990

(22) Filed: Dec. 13, 2021

(65) Prior Publication Data

US 2022/0171544 A1    Jun. 2, 2022

Related U.S. Application Data

(63) Continuation of application No. 16/730,832, filed on Dec. 30, 2019, now Pat. No. 11,199,979, which is a
(Continued)

(51) Int. Cl.
*G06F 3/00* (2006.01)
*G06F 3/06* (2006.01)
(Continued)

(52) U.S. Cl.
CPC ............ *G06F 3/0619* (2013.01); *G06F 3/065* (2013.01); *G06F 3/067* (2013.01);
(Continued)

(58) Field of Classification Search
None
See application file for complete search history.

(56) References Cited

U.S. PATENT DOCUMENTS 8,286,030 B1  10/2012  Chatterjee et al.
9,020,895 B1   4/2015  Rajashekar et al.
(Continued)

FOREIGN PATENT DOCUMENTS

WO    2010002408 A1    1/2010

OTHER PUBLICATIONS

Int. Search Report/Written Opinion cited in PCT/US/2017/18797 dated May 4, 2017, 36 pgs.

*Primary Examiner* — Midys Rojas
(74) *Attorney, Agent, or Firm* — COOPER LEGAL GROUP, LLC

(57) ABSTRACT

One or more techniques and/or computing devices are provided for utilizing snapshots for data integrity validation and/or faster application recovery. For example, a first storage controller, hosting first storage, has a synchronous replication relationship with a second storage controller hosting second storage. A snapshot replication policy rule is defined to specify that a replication label is to be used for snapshot create requests, targeting the first storage, that are to be replicated to the second storage. A snapshot creation policy is created to issue snapshot create requests comprising the replication label. Thus a snapshot of the first storage and a replication snapshot of the second storage are created based upon a snapshot create request comprising the replication label. The snapshot and the replication snapshot may be compared for data integrity validation (e.g., determine whether the snapshots comprise the same data) and/or quickly recovering an application after a disaster.

20 Claims, 10 Drawing Sheets

Related U.S. Application Data continuation of application No. 16/265,032, filed on Feb. 1, 2019, now Pat. No. 10,552,064, which is a continuation of application No. 15/049,410, filed on Feb. 22, 2016, now Pat. No. 10,228,871.

(51) Int. Cl.
*G06F 11/20* (2006.01)
*G06F 11/16* (2006.01)

(52) U.S. Cl.
CPC ...... *G06F 11/1662* (2013.01); *G06F 11/2076* (2013.01); *G06F 11/2082* (2013.01); *G06F 2201/82* (2013.01); *G06F 2201/84* (2013.01)

(56) References Cited

U.S. PATENT DOCUMENTS

| | | | |
|---|---|---|---|
| 9,557,932 B1 * | 1/2017 | Chopra | G06F 11/1446 |
| 10,498,616 B1 * | 12/2019 | Delaney, Jr. | H04L 67/02 |
| 2009/0030983 A1 | 1/2009 | Malaiyandi et al. | |
| 2011/0099148 A1 | 4/2011 | Bruning et al. | |
| 2020/0151146 A1 | 5/2020 | Dratyon et al. | |

\* cited by examiner

ENABLING DATA INTEGRITY CHECKING AND FASTER APPLICATION RECOVERY IN SYNCHRONOUS REPLICATED DATASETS

RELATED APPLICATIONS

This application claims priority to and is a continuation of U.S. application Ser. No. 16/730,832, filed on Dec. 30, 2019, now allowed, titled "ENABLING DATA INTEGRITY CHECKING AND FASTER APPLICATION RECOVERY IN SYNCHRONOUS REPLICATED DATASET," which claims priority to and is a continuation of U.S. Pat. No. 10,552,064, filed on Feb. 1, 2019 and titled "ENABLING DATA INTEGRITY CHECKING AND FASTER APPLICATION RECOVERY IN SYNCHRONOUS REPLICATED DATASET," which claims priority to and is a continuation of U.S. Pat. No. 10,228,871, filed on Feb. 22, 2016 and titled "ENABLING DATA INTEGRITY CHECKING AND FASTER APPLICATION RECOVERY IN SYNCHRONOUS REPLICATED DATASETS," which are incorporated herein by reference.

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices). In an example of a logical replication scheme, the second storage controller has ownership of the replicated data. The second storage controller may provide read-only access to the replicated data. The second storage controller may convert the replicated data to full read-write access upon failover. In an example of physical replication, the storage device, comprising the replicated data, is owned by the first storage controller until a failover/switchover to the second storage controller occurs.

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

In an example of a high availability configuration, high availability to data may be provided without using shared storage. In particular, high availability to data is provided using a synchronous replicated copy of a primary storage object. The high availability to data may be provided through a software defined architecture, using synchronous replication, and is not limited to merely two storage controllers.

Various replication and synchronization techniques may be used to replicate data (e.g., client data), configuration data (e.g., a size of a volume, a name of a volume, logical unit number (LUN) configuration data, etc.), and/or write caching data (e.g., cached write operations not yet flushed to a storage device, but cached within memory such as a non-volatile random access memory (NVRAM)) between storage controllers and/or storage devices. Synchronous replication may be used where an incoming write operation to the first storage controller is locally implemented upon a first storage object (e.g., a file, a LUN, a LUN spanning multiple volumes, a consistency group of files and/or LUNs, a directory, a volume, or any other type of object) by the first storage controller and remotely implemented upon a second storage object (e.g., maintained as a fully synchronized copy of the first storage object) by the second storage controller before an acknowledgement is provided back to a client that sent the incoming write operation. In another example, asynchronous replication may be achieved by capturing snapshots of a volume, determining data differences (e.g., deltas) between a current snapshot and a last snapshot used to replicate data to the second storage object, and using incremental transfers to send the data differences to the second storage controller for implementation upon the second storage object. Semi-synchronous replication may be achieved where an acknowledgment back to a client for a write request is based upon local implementation upon the first storage object, but is not dependent upon remote implementation upon the second storage object.

Data integrity validation, corresponding to whether data is being correctly replicated in a synchronous manner while preserving a write order consistency (e.g., if a write operation A depends upon completion of a write operation B, then a replicated write operation B should be implemented by the second storage controller before a replicated write operation A), and/or fast application recovery after a disaster (e.g., how quickly a database application can recover at the second storage controller during failover operation after the first storage controller, previously hosting data of the database application, fails or has a planned shutdown) may rely upon consistent point in time representations of the first storage object and the second storage object, such as snapshots. However, in-sync synchronous replication does not create or rely upon crash consistent snapshots for updating the second storage object (e.g., the mirrored storage object), and instead relies upon a write splitter to update the second storage object, and thus such consistent point in time snapshots may not be available for data integrity validation and fast application recovery for storage controllers with a synchronous replication relationship.

DETAILED DESCRIPTION

Figure 1:
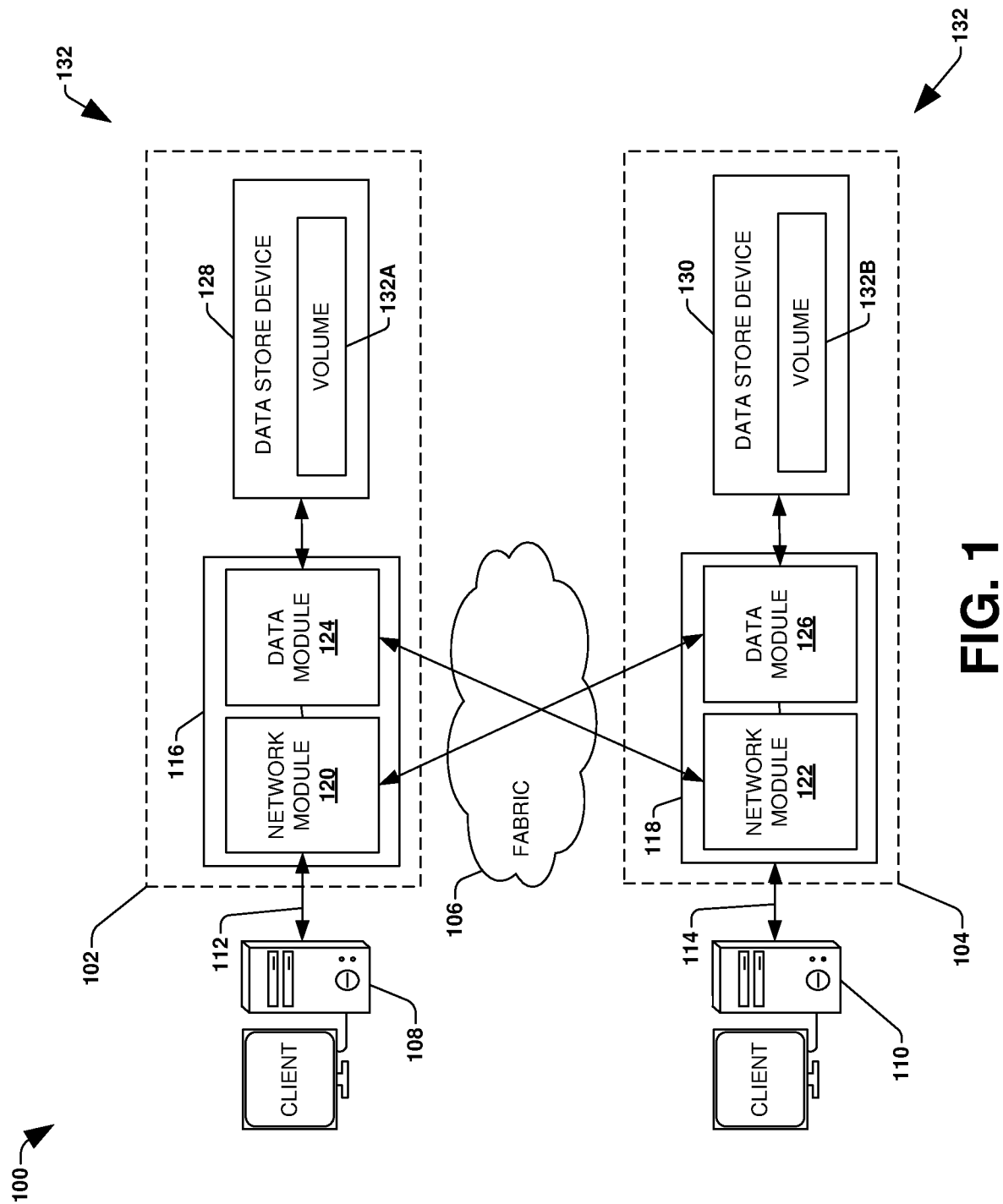
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for utilizing snapshots for data integrity validation and/or application recovery are provided herein. For example, a first storage controller, hosting first storage, may have a synchronous replication relationship with a second storage controller hosting second storage, such that an operation targeting the first storage may be replicated to the second storage before the operation is acknowledged back to a client. The synchronous replication relationship may be specified for any level of granularity of data, such as for a file, a logical unit number (LUN), a consistency group of files and/or LUNs, a directory, a volume, and/or any other storage object. Data integrity validation and/or efficient application recovery may leverage consistent point in time representations of the first storage and the second storage, such as snapshots. However, synchronous replication splits operations, targeting the first storage, into replication operations to target the second storage, as opposed to creating and using snapshots. Accordingly, as provided herein, snapshot create requests, targeting the first storage, are replicated to the second storage controller to create replication snapshots of the second storage as consistent points in time. Such snapshots may be compared for data integrity validation to verify that synchronous replication is accurately replicating data to the second storage while maintaining a write order dependency. Also, snapshots, created with application integrity and thereby capturing application consistent point-in-time states, may be used to quickly recover an application. In this way, crash consistent snapshots may be periodically created by a snapshot creation policy defined on a storage device for data integrity checking. Data integrity checking may utilize any common snapshot and may not rely upon application integration. Application consistent snapshots may be created (e.g., by an application aware plugin at application consistent times) for data integrity checking and faster application recovery.

To provide context for utilizing snapshots for data integrity validation and/or application recovery, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides failover access to storage devices of a disaster cluster of nodes in the event a disaster occurs at a disaster storage site comprising the disaster cluster of nodes (e.g., the first cluster of nodes provides client devices with failover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network moduless 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that utilizing snapshots for data integrity validation and/or application recovery may be implemented within the clustered network environment 100. In an example, a snapshot of the volume 132A, maintained by the node 116 (e.g., a first storage controller), and a replication snapshot of the volume 132B, maintained by the node 118 (e.g., a second storage controller), may be created. The snapshots may be compared for data integrity validation and/or application recovery. It may be appreciated that utilizing snapshots for data integrity validation and/or application recovery may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
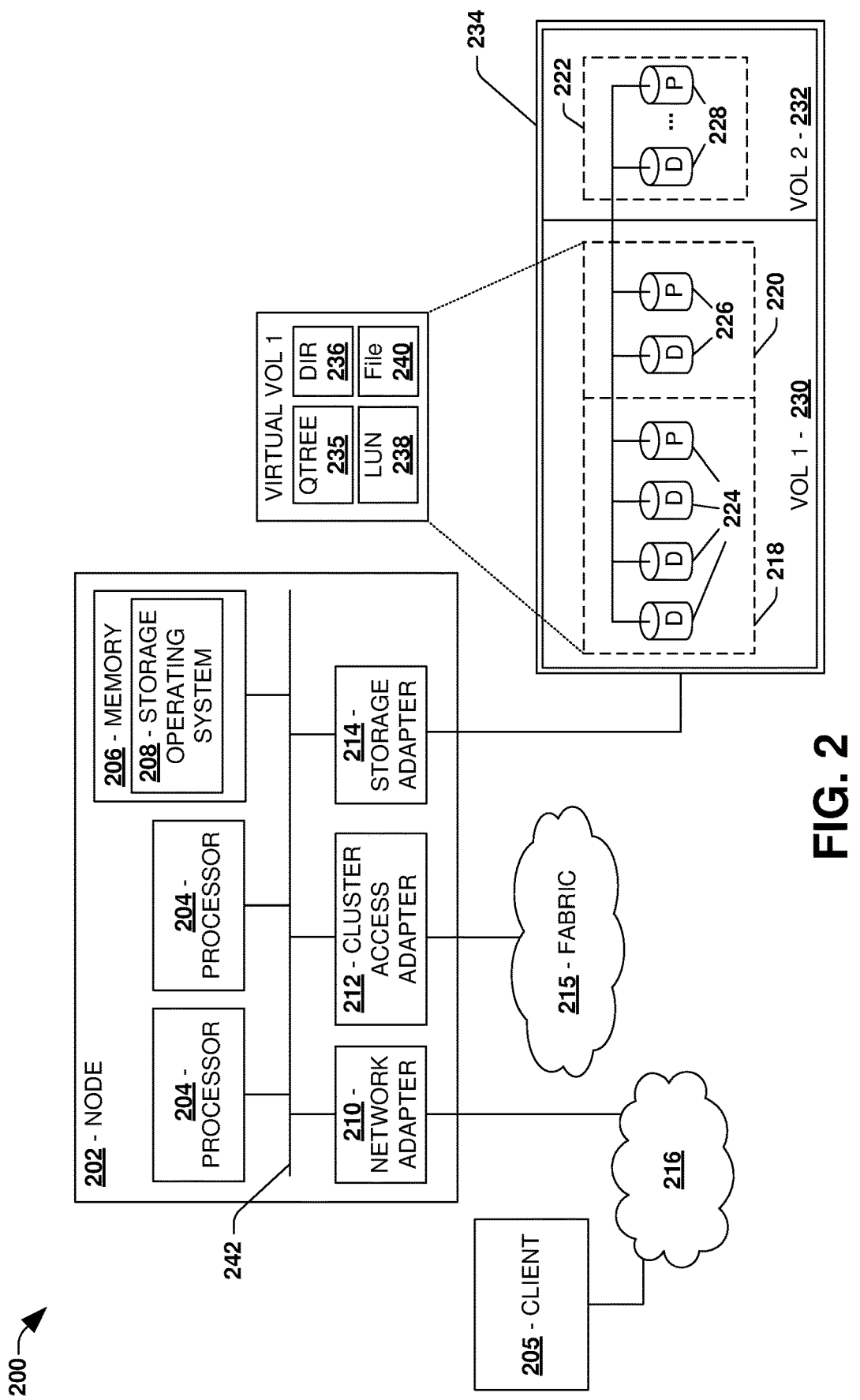
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that utilizing snapshots for data integrity validation and/or application recovery may be implemented for the data storage system 200. In an example, a snapshot of the volume 230, maintained by the node 202 (e.g., a first storage controller), and a replication snapshot of a second volume, maintained by a second node (e.g., a second storage controller), may be created. The snapshots may be compared for data integrity validation and/or application recovery. It may be appreciated that utilizing snapshots for data integrity validation and/or application recovery may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
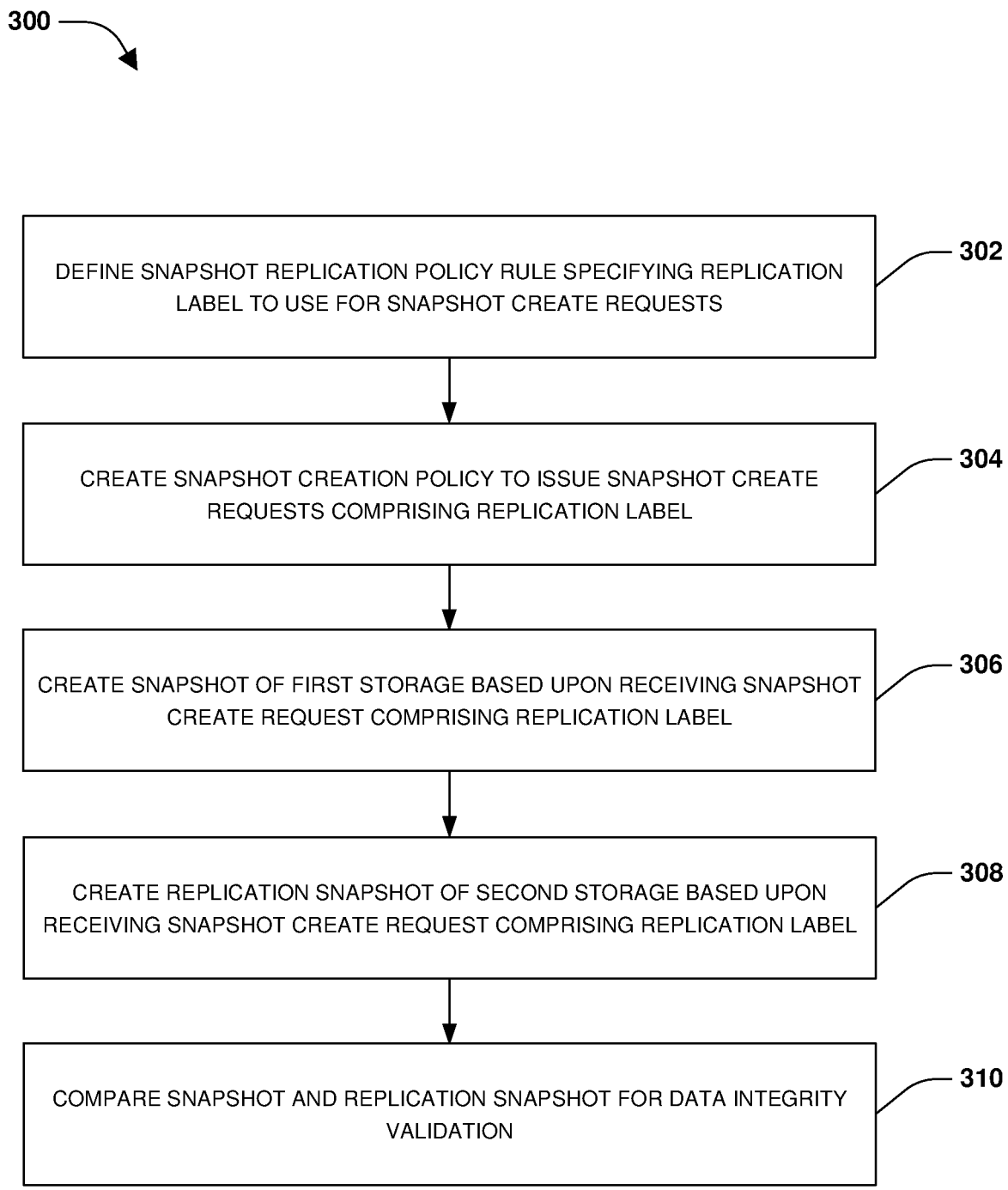
FIG. 3 is a flow chart illustrating an exemplary method of utilizing snapshots for data integrity validation and/or application recovery.

One embodiment of utilizing snapshots for data integrity validation and/or application recovery is illustrated by an exemplary method 300 of FIG. 3. A first storage controller may host first storage within which a client may store data. The first storage controller may have a synchronous replication relationship with a second storage controller (e.g., hosted within the same storage site as the first storage controller or hosted within a remote storage site such as a different building, city, or location than the first storage controller), such that data is replicated from the first storage to second storage accessible to the second storage controller. For example, while the synchronous replication relationship is in-sync, an incoming operation (e.g., a client write operation to modify the first storage) may be locally implemented upon the first storage and replicated to the second storage controller for remote implementation upon the second storage before the incoming operation is acknowledged back to a client. The synchronous replication relationship may be defined for a file, a LUN, a consistency group of files and/or LUNs, a directory, a volume, and/or any other storage object. The second storage controller may be configured as a disaster recovery partner for the first storage controller, such that if the first storage controller fails, then the second storage controller may provide clients with failover access to replicated data (e.g., data replicated from the first storage to the second storage whose ownership can be taken over by the second storage controller) previously accessible through the failed first storage controller.

In an example of synchronous replication, an operation, targeting a storage object within the first storage, may be received from a client (e.g., a client write operation to modify a file, a LUN, a consistency group, a directory, or any other storage object specified by the synchronous replication relationship). Responsive to determining that the synchronous replication relationship applies to the storage object, the operation may be split into a replication operation. The operation may be locally implemented upon the storage object. The replication operation may be sent to the second storage controller for remote implementation upon a replicated storage object within the second storage. The replicated storage object corresponds to a mirror/replica of the storage object. Responsive to the operation and the replication operation completing, an acknowledgement may be provided back to the client.

At 302, a snapshot replication policy rule may be defined for the synchronous replication relationship. The snapshot replication policy rule may specify that a replication label (e.g., a string, such as "my validation snapshots", not commonly used for snapshots) will be used for snapshot create requests, targeting the first storage, that are to be replicated to the second storage. The snapshot replication policy rule (e.g., a rule within a snapshot replication policy corresponding to a configuration for a synchronous replication data path) may be attached to the synchronous replication relationship.

At 304, a snapshot creation policy, to issue snapshot create requests comprising the replication label, may be created. In an example, the snapshot creation policy may be attached to the first storage (e.g., attached to a volume). For example, the snapshot creation policy may comprise a schedule parameter for a snapshot policy to create snapshot create requests with the replication label.

In an example, a replication mechanism (e.g., an application consistent snapshot (ACS) replication mechanism) may receive a snapshot create request. The replication mechanism may evaluate the snapshot create request to determine whether the snapshot create request comprises the replication label specified within the snapshot replication policy rule. Responsive to the snapshot create request not comprising the replication label, a snapshot of the first storage at the first storage controller may be created without creating a corresponding replication snapshot of the second storage at the second storage controller.

Responsive to the snapshot create request comprising the replication label, a snapshot of the first storage may be created at the first storage controller, at 306. At 308, the snapshot create request may be replicated to the second storage controller based upon the snapshot create request comprising the replication label, such that a replication snapshot of the second storage is created at the second storage controller. In this way, the snapshot and the replication snapshot should be consistent point in time representations of the first and second storage, and thus may be evaluated to determine whether synchronous replication is being performed correctly.

At 310, the snapshot and the replication snapshot may be compared for data integrity validation (e.g., compared to determine whether the replication snapshot comprises the same data as the snapshot, thus the first storage and the second storage comprised the same data, which may indicate that data was being correctly replicated from the first storage to the second storage). In an example, responsive to the snapshot and the replication snapshot comprising different data, a determination may be made that synchronous replication, between the first storage controller and the second storage controller based upon the synchronous replication relationship, is not being performed correctly. In another example, a dependent write order consistency of replication operations to the second storage may be verified based upon the comparison of the snapshot and the replication snapshot (e.g., if a write operation A depends upon completion of a write operation B, then a replicated write operation B should be implemented by the second storage controller before a replicated write operation A).

In an example, the snapshot may be an application consistent snapshot associated with an application that utilizes the first storage (e.g., a database application) and the replication snapshot may be a replication application consistent snapshot. For example, the application consistent snapshot and the replication application consistent snapshot may be created in response to a storage system replication module, integrated within the application, issuing a storage operating system API command, such as a ZAPI command, comprising the replication label as the snapshot create request. In particular, the application may be consulted to determine a consistent point in time for the application (e.g., the database may have little to no client access from midnight to 1:00 am). Accordingly, the snapshot create request, comprising the replication label, may be sent based upon the consistent point in time.

The application consistent snapshot and/or the replication application consistent snapshot may be used to quickly recover the application, previously using the first storage, to use the second storage in the event the first storage controller fails or a failover command is received. Responsive to receiving the failover command or identifying the failure, a failover operation, from the first storage controller to the second storage controller for providing clients with failover access to replicated data within the second storage, may be performed. In an example, the failover operation may be triggered within a threshold amount of time (e.g., contemporaneously with) the creation of the application consistent snapshot and/or the replication application consistent snapshot, which may mitigate data loss (e.g., improve a recovery time objective (RTO) to more quickly recover the application, which may be improved by trading off a recovery point objective (RPO) with some data loss, and such data loss may be mitigated by reducing the time between the creation of the application consistent snapshot and triggering failover) when using the application consistent snapshot and/or the replication application consistent snapshot for recovering the application. In this way, the replication application consistent snapshot may be utilized to recover the application to utilize the second storage in place of the first storage. The application may recover more quickly because the replication application consistent snapshot is used, and thus rolling forward, rolling backwards, and/or other recovery overhead processing may not be needed.

Figure 4A:
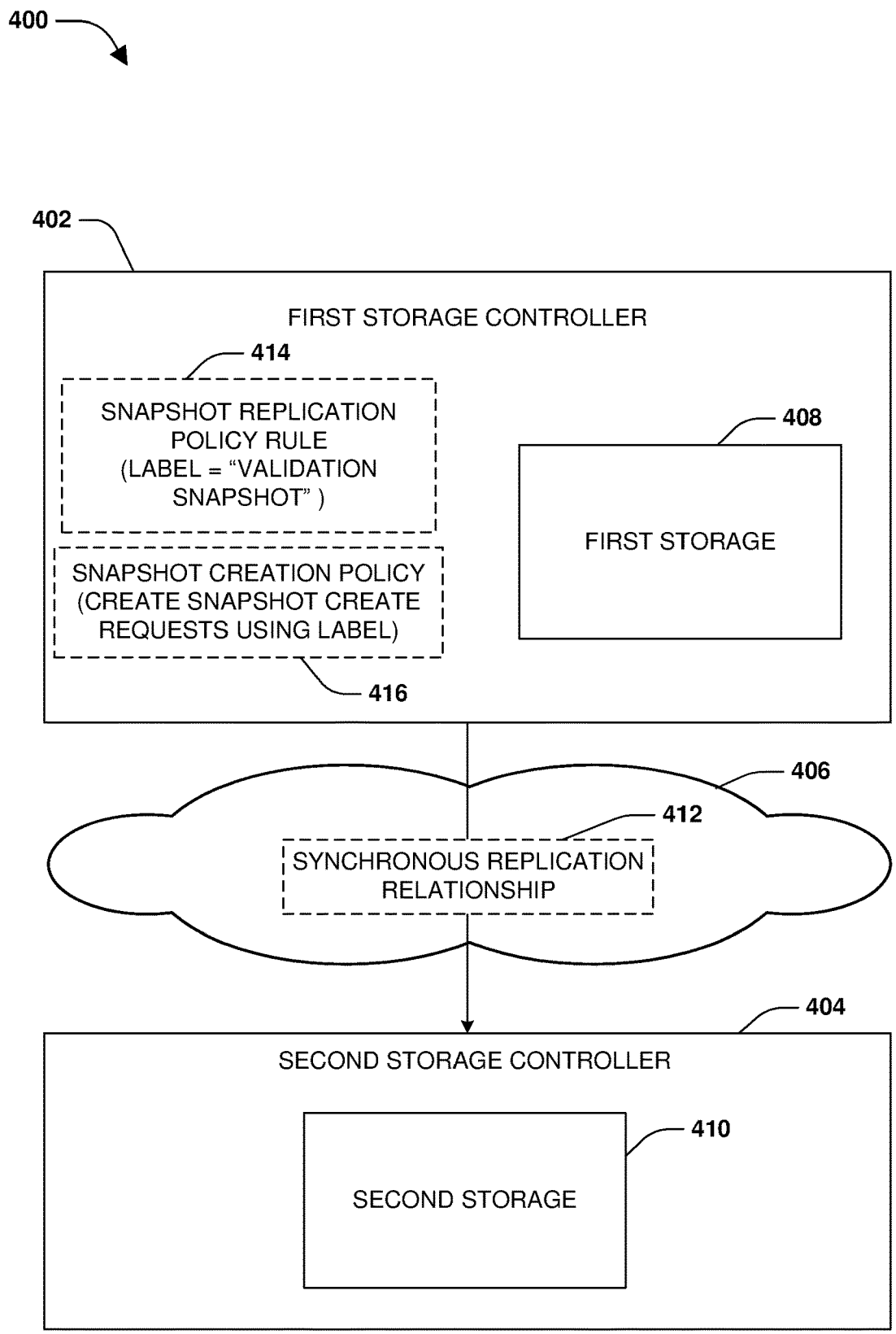
FIG. 4A is a component block diagram illustrating an exemplary computing device for utilizing snapshots for data integrity validation, where a snapshot replication policy rule is defined and a snapshot creation policy is created.
Figure 4B:
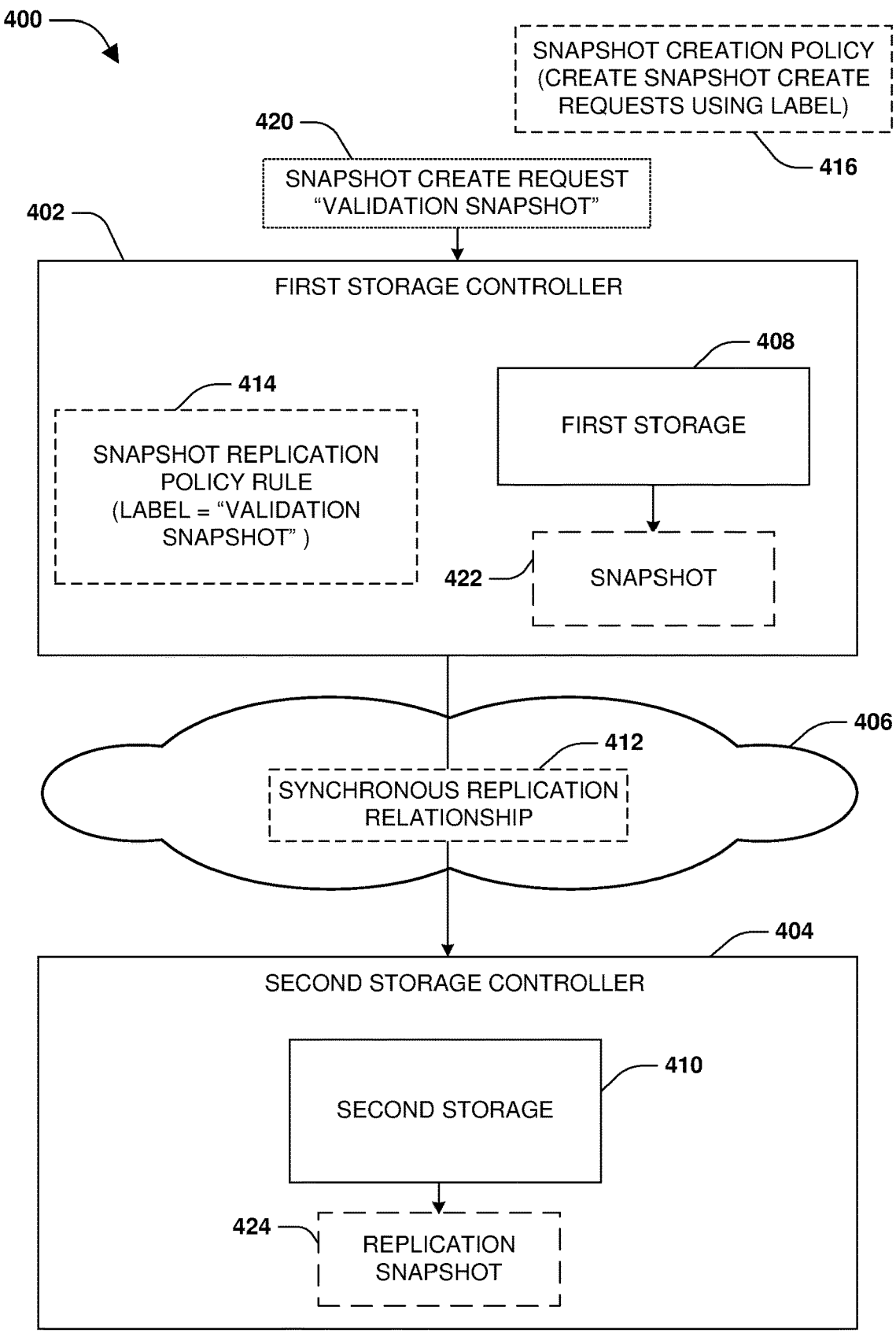
FIG. 4B is a component block diagram illustrating an exemplary computing device for utilizing snapshots for data integrity validation, where a snapshot of first storage and a replication snapshot of second storage is created.
Figure 4C:
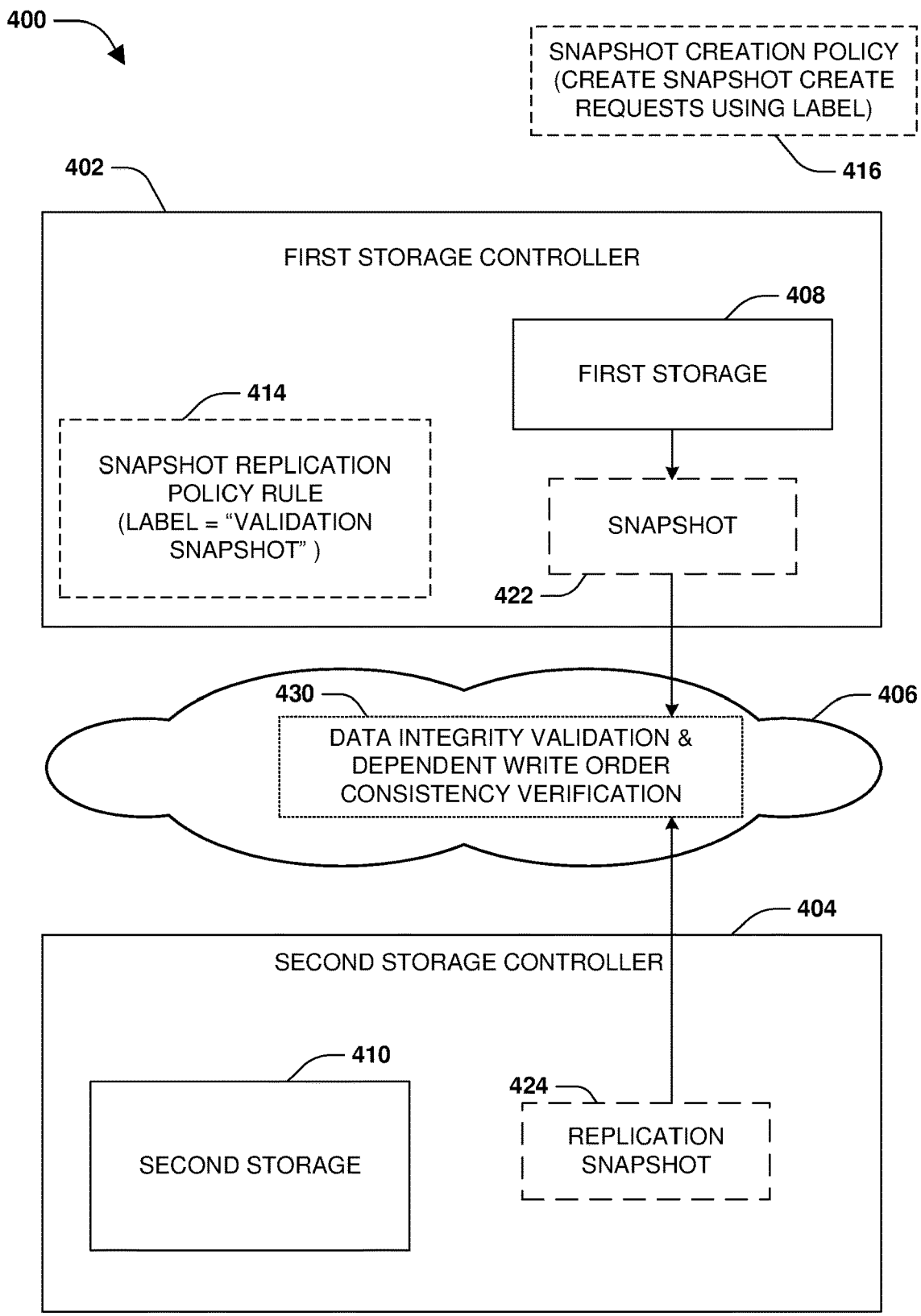
FIG. 4C is a component block diagram illustrating an exemplary computing device for utilizing snapshots for data integrity validation.

FIGS. 4A-4C illustrate examples of a system 400 for utilizing snapshots for data integrity validation. FIG. 4A illustrates a first storage controller 402, hosting first storage 408, having a synchronous replication relationship 412 with a second storage controller 404 hosting second storage 410 (e.g., a file, a LUN, a consistency group of files or LUNs, a directory, and/or any other storage object may be synchronously replicated from the first storage 408 to the second storage 410 as replicated data). The first storage controller 402 may be capable of communicating with the second storage controller 404 over a network 406. The second storage controller 404 may be configured as a disaster recovery partner for the first storage controller 402, such that the second storage controller 404 may provide clients with failover access to replicated data (e.g., data replicated from the first storage 408 to the second storage 410) in the event the first storage controller 402 fails.

A snapshot replication policy rule 414 may be defined for the synchronous replication relationship 412. The snapshot replication policy rule 414 may specify that a replication label (e.g. a string, such as "validation snapshot") will be used to label snapshot create requests, targeting the first storage 408, that are to be replicated to the second storage 410. A snapshot creation policy 416 may be created to issue snapshot create requests with the replication label. In an example, the snapshot creation policy 416 may be hosted on an application server, not illustrated, separate from the first storage controller 402.

FIG. 4B illustrates a snapshot create request 420 being created with the replication label based upon the snapshot creation policy 416 (e.g., the application server may create and issue the snapshot create request 420 to the first storage controller 402). The snapshot replication policy rule 414 may be used to evaluate the snapshot create request 420 to determine that the snapshot create request 420 comprises the replication label indicating that the snapshot create request 420 is to be replicated to the second storage 410. Accordingly, the snapshot create request 420 may be locally implemented upon the first storage 408 to create a snapshot 422 comprising a point in time representation of data within the first storage 408. The snapshot create request 420 may be replicated to the second storage controller 404 for creating a replication snapshot 424 comprising a point in time representation of data within the second storage 410.

FIG. 4C illustrates the snapshot 422 and the replication snapshot 424 being compared 430 for data integrity validation and/or dependent write order consistency verification. In an example of data integrity validation, the snapshot 422 and the replication snapshot 424 may be evaluated to determine whether data of the first storage 408 and the second storage 410 was the same (e.g., synchronous replication was working correctly to replicate operations, targeting the first storage 408, to the second storage 410) or different (e.g., the synchronous replication was not working correctly, and thus troubleshooting may be performed) when the snapshots were created. In an example of dependent write order consistency verification, the content of the snapshot 422 and the replication snapshot 424 may be evaluated to determine whether replicated operations were being implemented upon the second storage 410 is a correct order to preserve dependencies between operations.

Figure 5A:
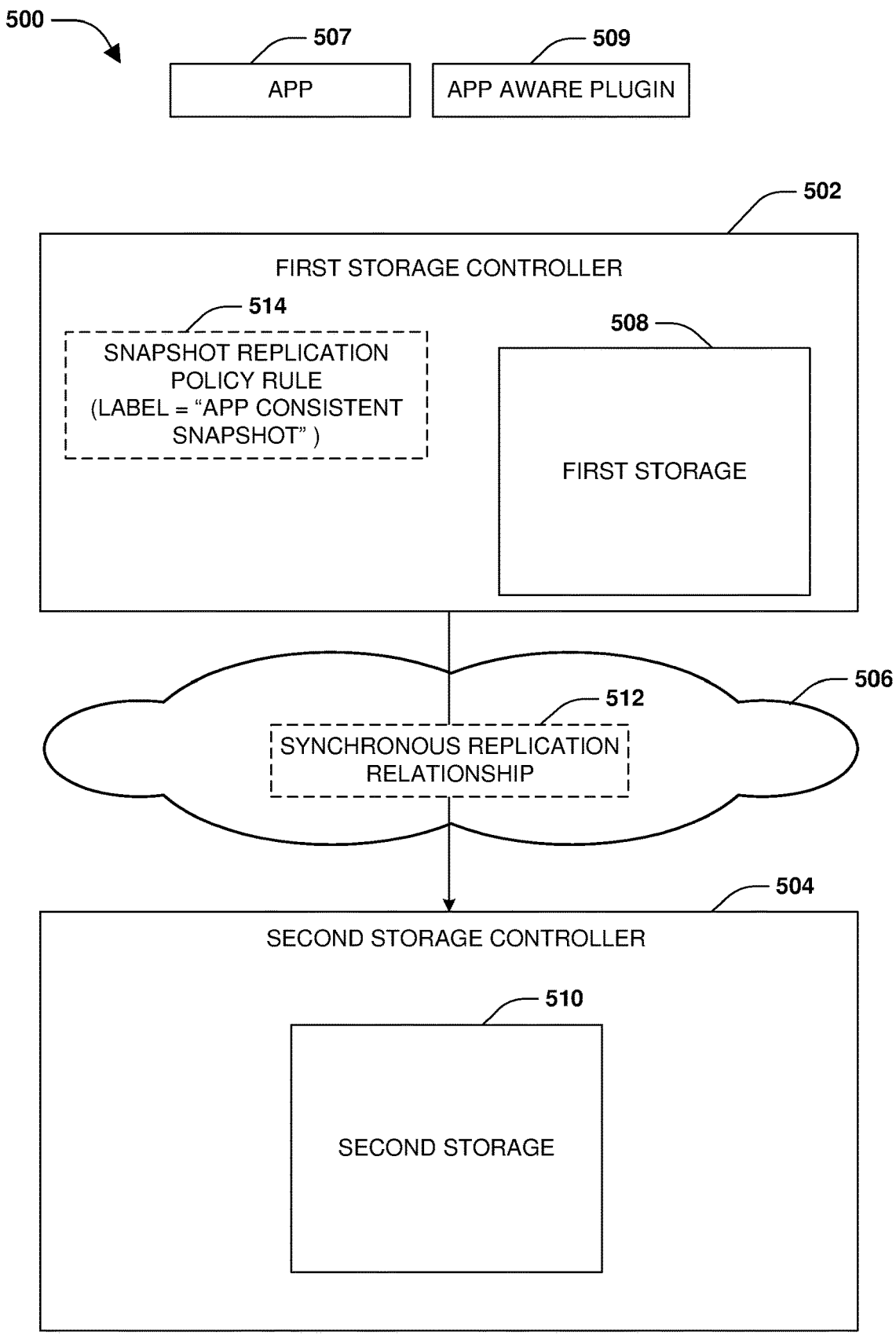
FIG. 5A is a component block diagram illustrating an exemplary computing device for utilizing snapshots for application recovery, where a snapshot replication policy rule is defined.
Figure 5B:
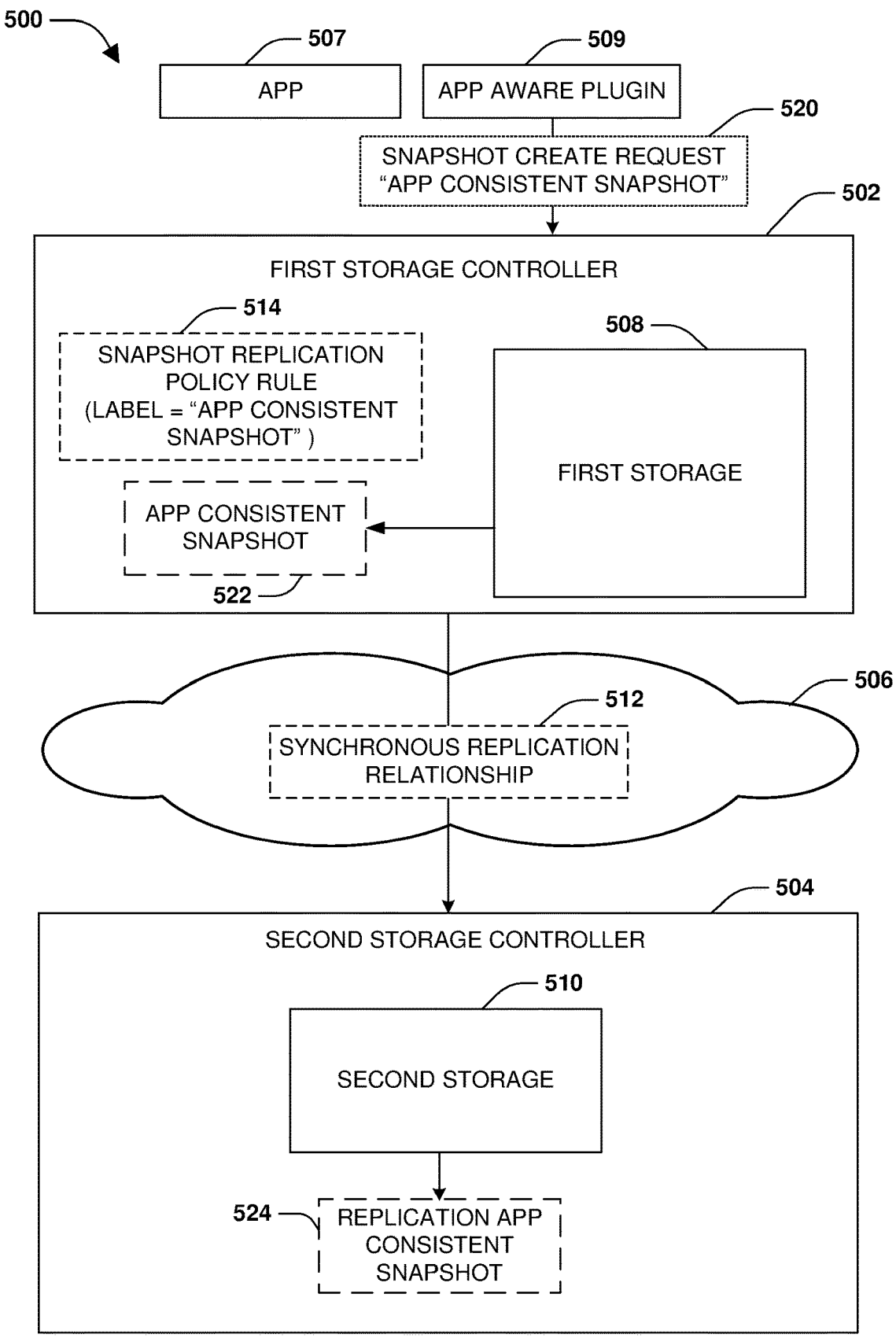
FIG. 5B is a component block diagram illustrating an exemplary computing device for utilizing snapshots for application recovery, where a snapshot of first storage and a replication snapshot of second storage is created.
Figure 5C:
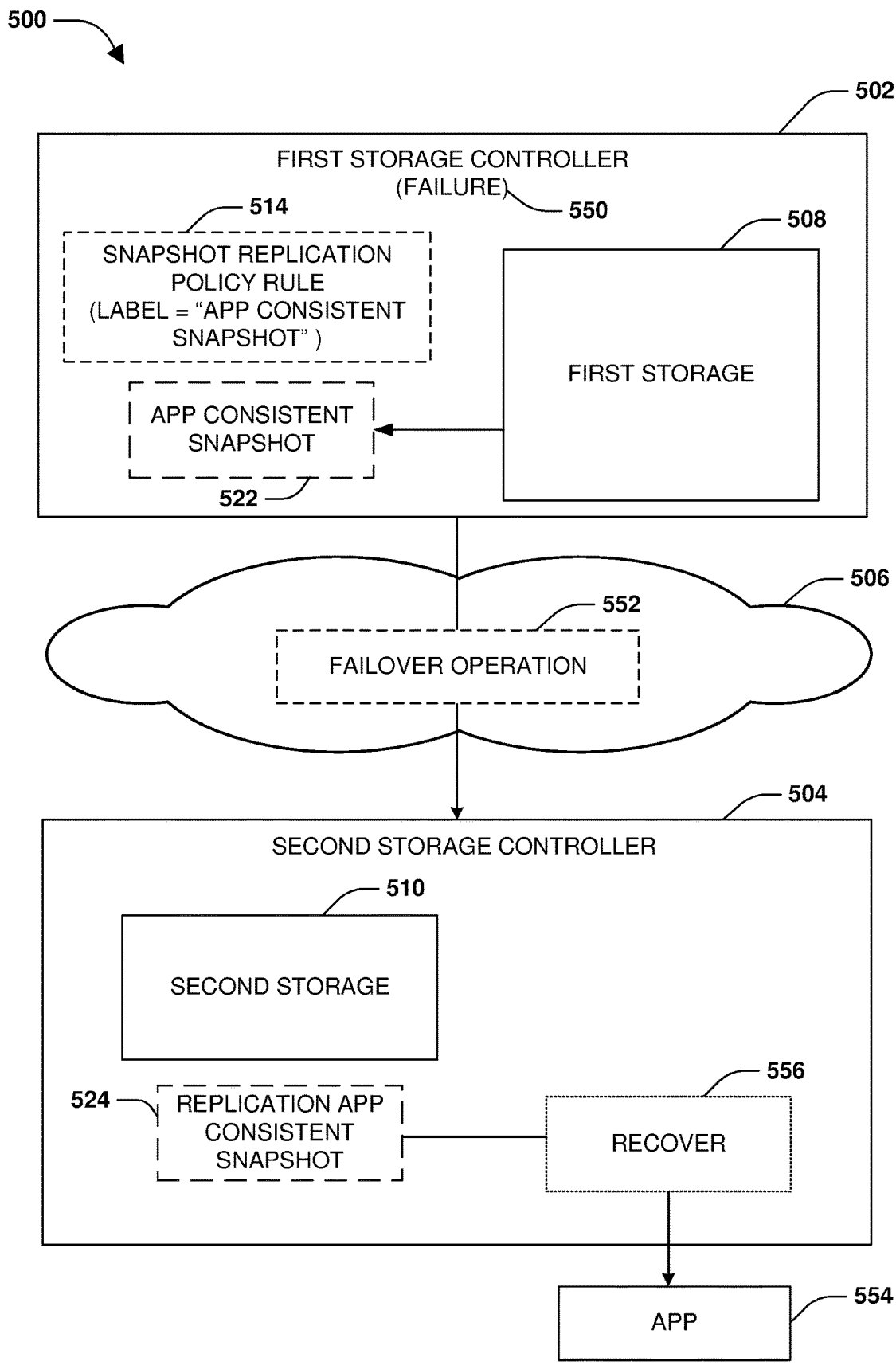
FIG. 5C is a component block diagram illustrating an exemplary computing device for utilizing snapshots for application recovery.

FIGS. 5A-5C illustrate examples of a system 500 for utilizing snapshots for application recovery (e.g., application consistent snapshots, common snapshots, etc.). FIG. 5A illustrates a first storage controller 502, hosting first storage 508, having a synchronous replication relationship 512 with a second storage controller 504 hosting second storage 510. The first storage controller 502 may be capable of communicating with the second storage controller 504 over a network 506. The second storage controller 504 may be configured as a disaster recovery partner for the first storage controller 502, such that the second storage controller 504 may provide clients with failover access to replicated data (e.g., data replicated from the first storage 508 to the second storage 510) in the event the first storage controller 502 fails. The first storage controller 502 may host an application 507, such as a database application, that utilizes the first storage 508. The application 507 may be associated with an application aware plugin 509 that is configured to decide when an application consistent snapshot is to be created by coordinating with the application 507 (e.g., snapshots created at application consistent points in time for the application 507).

A snapshot replication policy rule 514 may be defined for the synchronous replication relationship 512. The snapshot replication policy rule 514 may specify that a replication label (e.g. a string, such as "app consistent snapshot") will be used to label snapshot create requests, targeting the first storage 508, that are to be replicated to the second storage 510.

FIG. 5B illustrates a snapshot create request 520 being created with the replication label by the application aware plugin 509. For example, the application 507 may be consulted to determine an application consistent point in time for the application 507 (e.g., a time period with little to no client access to the database application). The snapshot create request 520 may be sent based upon the application consistent point in time so that snapshots of the first storage 508 and the second storage 510 are created at application consistent points in time for the application 507. The snapshot create request 520 may be issued to the first storage controller 502 (e.g., a storage system replication module, integrated with the application 507, may issue a storage operating system API command, such as a ZAPI command, comprising the replication label as the snapshot create request 520). The snapshot replication policy rule 514 may be used to evaluate the snapshot create request 520 to determine that the snapshot create request 520 comprises the replication label indicating that the snapshot create request 520 is to be replicated to the second storage 510. Accordingly, the snapshot create request 520 may be locally implemented upon the first storage 508 to create an application consistent snapshot 522 comprising a point in time representation of data within the first storage 508. The snapshot create request 520 may be replicated to the second storage controller 504 for creating a replication application consistent snapshot 524 comprising a point in time representation of data within the second storage 510.

FIG. 5C illustrates a failover operation 552 from the first storage controller 502 to the second storage controller 504 being performed. In an example, the failover operation 552 may be performed in response to a failure 550 of the first storage controller 502. In another example, the failover operation 552 may be a planned failover operation where a storage administrator is planning to shut down or restart the first storage controller 502, and thus the failover operation 552 may be performed within a threshold amount of time from the creation of the application consistent snapshot 522 and/or the replication application consistent snapshot 524, which may mitigate data loss (e.g., and improve a recovery point objective (RPO)) otherwise occurring from operations being implemented after the snapshots were created and before the failover operation 552 is performed. In this way, the second storage controller 504 may takeover for the first storage controller 502 (e.g., obtain access to the second storage 510 for providing clients with failover access to replicated data, replicated from the first storage 508 to the second storage 510, in place of the first storage controller 502 providing primary access to original data within the first storage 508). The replication application consistent snapshot 524 may be used to efficiently and quickly (e.g., without performing rollbacks, roll forwards, and/or other time and resource intensive tasks) recover 556 the application 507 as a recovered application 554 that will utilize the second storage 510 in place of previously using the first storage 508 (e.g., the database application may now use the second storage 510 for maintaining the database). In an example, files and/or LUNs may be restored back to a consistent snapshot before access is provided to the application 507.

Figure 6:
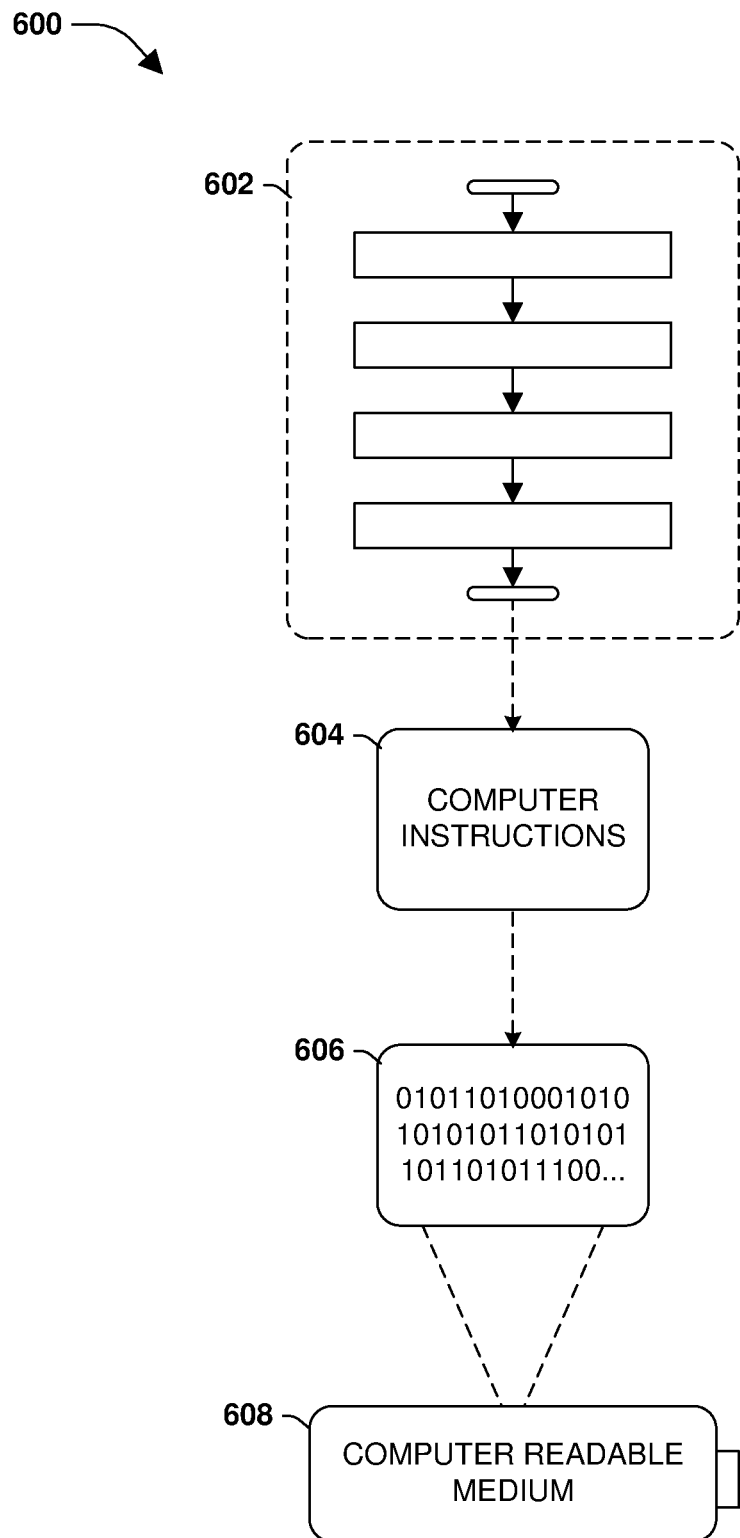
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a processor-executable computer instructions 604 configured to operate according to one or more of the principles set forth herein. In some embodiments, the processor-executable computer instructions 604 are configured to perform a method 602, such as at least some of the exemplary method 300 of FIG. 3, for example. In some embodiments, the processor-executable computer instructions 604 are configured to implement a system, such as at least some of the exemplary system 400 of FIGS. 4A-4C and/or at least some of the exemplary system 500 of FIGS. 5A-5C, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    creating a snapshot of first storage based upon a determination that a snapshot request comprises a replication label specified by a snapshot replication policy rule;
    creating a replication snapshot of second storage that is maintained as a replication destination for the first storage; and comparing the snapshot and the replication snapshot to determine whether synchronous replication between a first controller hosting the first storage and a second controller hosting the second storage is being performed correctly.

2. The method of claim 1, comprising:
performing a data integrity validation upon the snapshot and the replication snapshot to determine that data is being correctly replicated by the synchronous replication from the first storage to the second storage based upon the snapshot and the replication snapshot comprising the same data.

3. The method of claim 1, comprising:
performing a data integrity validation upon the snapshot and the replication snapshot to determine that data is not being correctly replicated by the synchronous replication from the first storage to the second storage based upon the snapshot and the replication snapshot comprising different data.

4. The method of claim 1, comprising:
determining a dependent write order corresponding to an order with which operations, executed upon the first storage, are dependent upon one another; and
verifying whether a dependent write order consistency of replication operations to the second storage has been maintained based upon whether the replication operations are executed upon the second storage according to the order with which corresponding operations were executed upon the first storage according to the dependent write order.

5. The method of claim 1, comprising:
receiving an operation, targeting a storage object within the first storage, from a client;
responsive to determining that a synchronous replication relationship applies to the storage object, replicating the operation as a replication operation that is a replica of the operation;
locally implementing the operation upon the storage object;
sending the replication operation to the second controller for remote implementation upon a replicated storage object within the second storage, the replicated storage object corresponding to a backup replication of the storage object; and
responsive to the operation and the replication operation completing, acknowledging back to the client.

6. The method of claim 5, wherein the locally implementing comprises:
completing pending operations targeting the storage object before locally implementing the operation.

7. The method of claim 5, wherein the locally implementing comprises:
receiving a new operation, targeting the storage object, while locally implementing the operation;
queueing the new operation into a queue as a queued operation; and
responsive to locally implementing the operation, dequeuing and implementing the queued operation.

8. The method of claim 1, comprising:
identifying a failure of a first storage controller hosting the first storage;
performing a switchover operation from the first storage controller to a second storage controller hosting the second storage for providing clients with failover access to replicated data within the second storage; and
utilizing the replication snapshot to recover an application to utilize the second storage in place of the first storage.

9. The method of claim 1, comprising:
receiving a switchover command to switchover from a first storage controller hosting the first storage to a second storage controller hosting the second storage;
performing a switchover operation from the first storage controller to the second storage controller for providing clients with failover access to replicated data within the second storage based upon the switchover command; and
utilizing the replication snapshot to recover an application to utilize the second storage in place of the first storage.

10. A non-transitory machine readable medium having stored thereon machine executable code which when executed by a machine, causes the machine to:
receive an operation, targeting a storage object within first storage, from a client;
responsive to determining that a synchronous replication relationship between a first controller hosting the first storage and a second controller hosting second storage applies to the storage object, split the operation into a replication operation;
locally implement the operation upon the storage object;
send the replication operation to the second controller for remote implementation upon a replicated storage object within the second storage, the replicated storage object corresponding to a backup replication of the storage object;
responsive to the operation and the replication operation completing, acknowledge back to the client; and
creating a snapshot of the first storage based upon a determination that a snapshot request comprises a replication label specified by a snapshot replication policy rule.

11. The non-transitory machine readable medium of claim 10, wherein the machine executable code causes the machine to:
complete pending operations targeting the storage object before locally implementing the operation.

12. The non-transitory machine readable medium of claim 10, wherein the machine executable code causes the machine to:
receive a new operation, targeting the storage object, while locally implementing the operation;
queue the new operation into a queue as a queued operation; and
responsive to locally implementing the operation, dequeue and implement the queued operation.

13. The non-transitory machine readable medium of claim 10, wherein the machine executable code causes the machine to:
in response to the synchronous replication not working correctly, implement a troubleshooting action.

14. The non-transitory machine readable medium of claim 10, wherein the machine executable code causes the machine to:
determine that the synchronous replication is being performed incorrectly based upon the snapshot of the first storage and a replication snapshot of the second storage comprising different data.

15. The non-transitory machine readable medium of claim 10, wherein the machine executable code causes the machine to:
identify a failure of a first storage controller hosting the first storage;
perform a switchover operation from the first storage controller to a second storage controller hosting the second storage for providing clients with failover access to replicated data within the second storage; and utilize a replication snapshot to recover an application to utilize the second storage in place of the first storage.

16. The non-transitory machine readable medium of claim 10, wherein the machine executable code causes the machine to:

receive a switchover command to switchover from a first storage controller hosting the first storage to a second storage controller hosting the second storage;

perform a switchover operation from the first storage controller to the second storage controller for providing clients with failover access to replicated data within the second storage based upon the switchover command; and utilize a replication snapshot to recover an application to utilize the second storage in place of the first storage.

17. A computing device comprising:

a memory containing machine readable medium comprising machine executable code having stored thereon instructions for performing a method; and a processor coupled to the memory, the processor configured to execute the machine executable code to cause the processor to:

create a snapshot of first storage based upon a determination that a snapshot request comprises a replication label specified by a snapshot replication policy rule;

create a replication snapshot of second storage that is maintained as a replication destination for the first storage;

compare the snapshot and the replication snapshot to determine whether synchronous replication between a first controller hosting the first storage and a second controller hosting the second storage is being performed correctly; and in response to the synchronous replication not working correctly, implement a troubleshooting action.

18. The computing device of claim 17, and wherein the machine executable code causes the processor to:

perform a data integrity validation upon the snapshot and the replication snapshot to determine that data is being correctly replicated by the synchronous replication from the first storage to the second storage based upon the snapshot and the replication snapshot comprising the same data.

19. The computing device of claim 17, and wherein the machine executable code causes the processor to:

perform a data integrity validation upon the snapshot and the replication snapshot to determine that data is not being correctly replicated by the synchronous replication from the first storage to the second storage based upon the snapshot and the replication snapshot comprising different data.

20. The computing device of claim 17, and wherein the machine executable code causes the processor to:

receive an operation, targeting a storage object within the first storage, from a client;

responsive to determining that a synchronous replication relationship applies to the storage object, split the operation into a replication operation;

locally implement the operation upon the storage object;

send the replication operation to the second controller for remote implementation upon a replicated storage object within the second storage, the replicated storage object corresponding to a backup replication of the storage object; and responsive to the operation and the replication operation completing, acknowledge back to the client.

* * * * *